Feb. 17, 1925.
C. S. WRIGHT
1,526,653
FRICTION CLUTCH
Filed Oct. 5, 1923  2 Sheets-Sheet 2
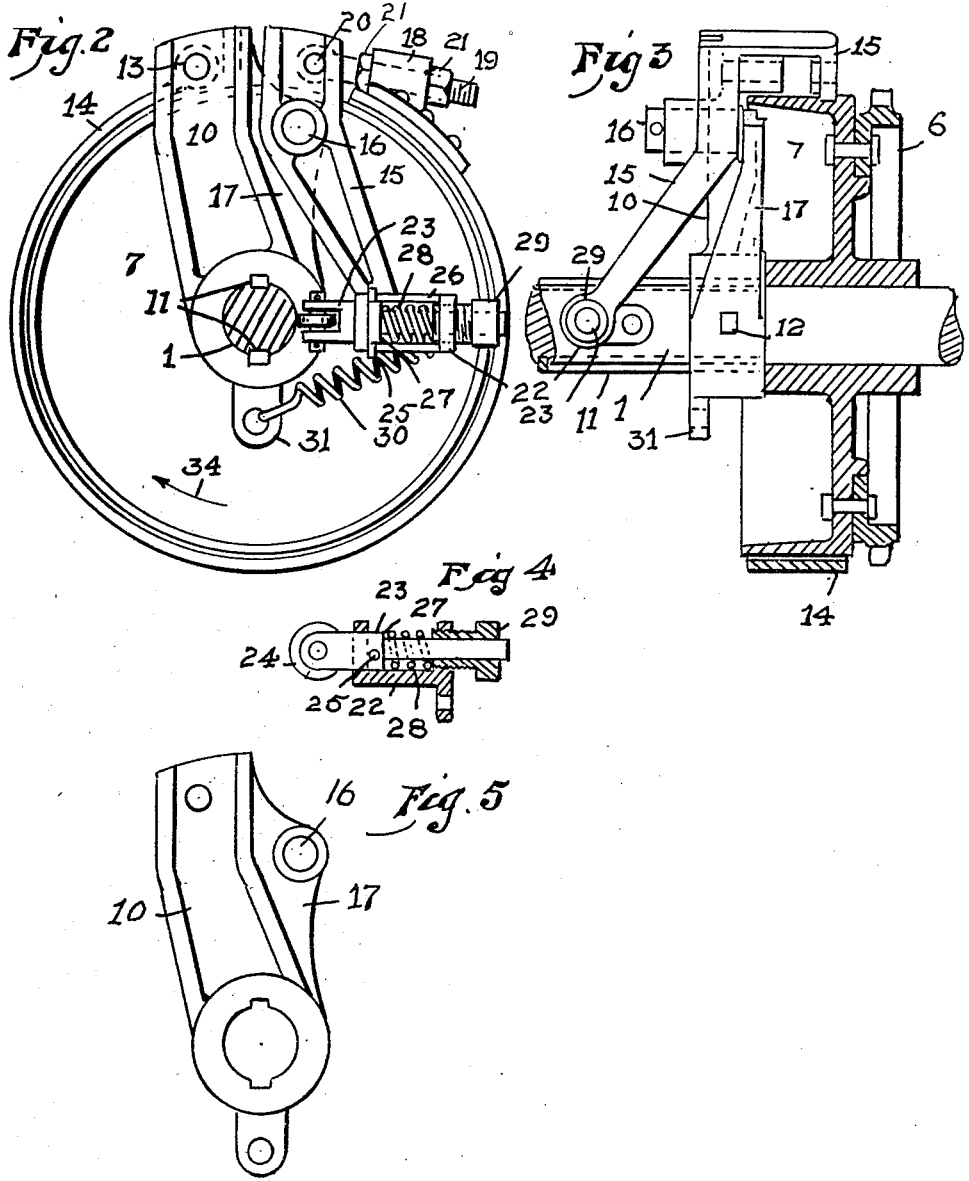
INVENTOR
C. S. Wright
by F. N. Barber
attorney Patented Feb. 17, 1925.

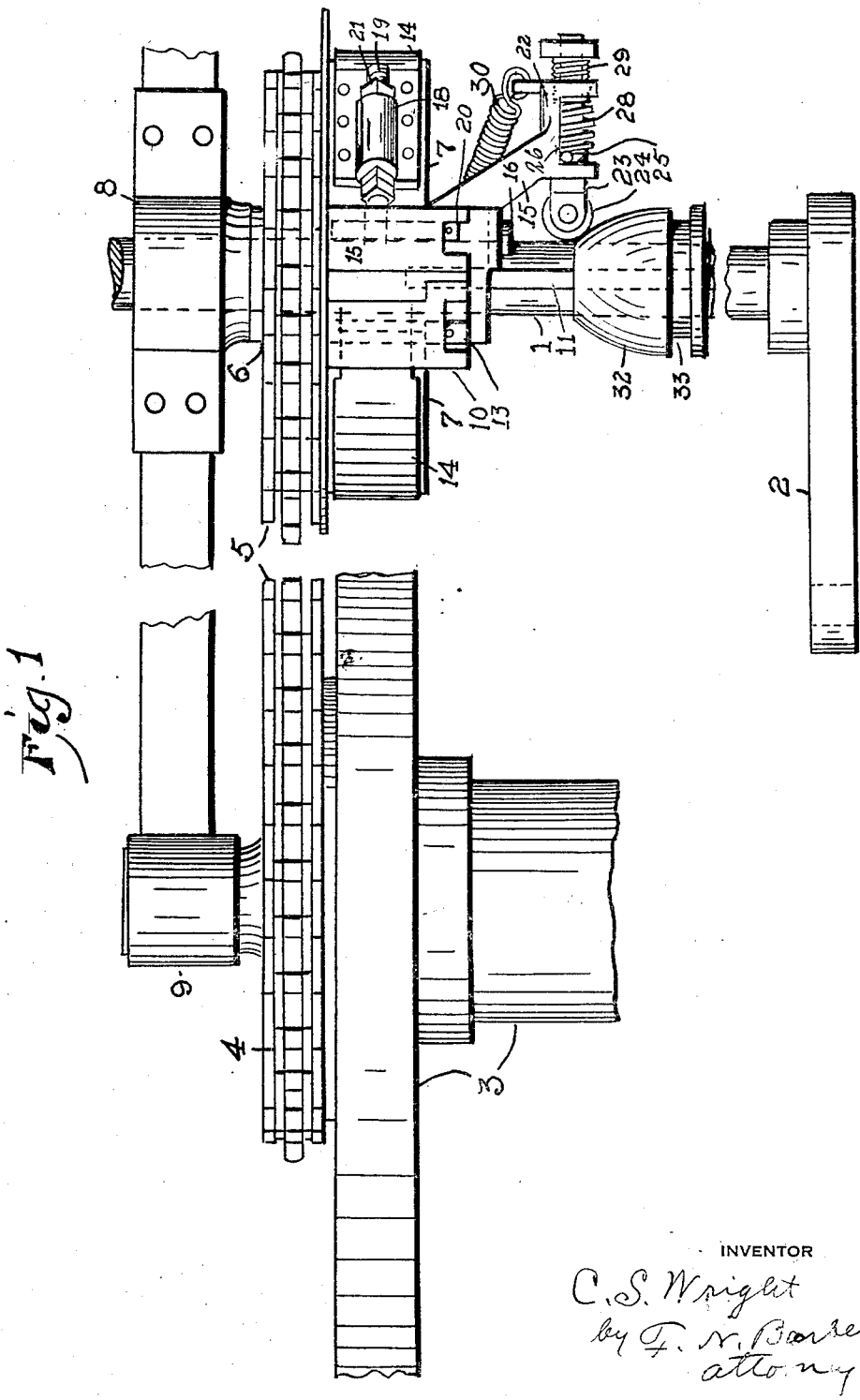

1,526,653

UNITED STATES PATENT OFFICE.

CLYDE S. WRIGHT, OF TOLEDO, OHIO, ASSIGNOR TO THE NATIONAL SUPPLY COMPANY, OF TOLEDO, OHIO, A CORPORATION OF OHIO.

FRICTION CLUTCH.

Application filed October 5, 1923. Serial No. 666,747.

*To all whom it may concern:*

Be it known that I, CLYDE S. WRIGHT, a citizen of the United States, residing at Toledo, in the county of Lucas and State of Ohio, have invented new and useful Improvements in Friction Clutches, of which the following is a specification.

My invention relates to friction clutches and to their application to the bull-wheels of well-drilling machinery.

It is one of the objects of the present invention to provide a friction clutch which is particularly adaptable to the requirements of well-drilling machinery, the clutch having novel means for relieving the snubbing effect of the clutch-band when the direction of the load is reversed through the clutch. Another object is to provide a friction clutch in combination with the bull-wheel of a well-drilling apparatus.

Referring to the accompanying drawings, Fig. 1 is a plan view of a well-drilling mechanism showing my invention, parts being omitted and broken away; Fig. 2, an end elevation of my friction clutch with its driving shaft shown in cross-section; Fig. 3, a view at right angles to Fig. 2, parts being in section; Fig. 4, a sectional detail of the automatic clutch relieving device; and Fig. 5, an elevation of the clutch driving-arm.

On the drawings, 1 designates the driving or power shaft of a well-drilling rig of the cable-tool type, one end of the shaft having the crank-arm 2 for actuating the walking beam (not shown) used with that type of rig. 3 is the bull-wheel or drum having the sprocket wheel 4 connected by the sprocket chain 5 to the sprocket wheel 6 secured to the outer end face of the clutch drum 7 loose on the shaft 1. 8 is a bearing for one end of the shaft 1, and 9 for one end of the bull-wheel 3.

The drive-arm 10 is secured rigidly to the shaft 1 by the feather keys 11 and the set screw 12. This arm 10 extends radially beyond the periphery of the drum 7 where it is provided with the pin 13 to which one end of the clutch band 14 is connected. 15 is the clutch lever pivoted between its ends on the pin 16 carried by the extension 17 on the adjacent edge of the arm 10. The extension 17 is set back from the outer face of the arm 10, as shown in Fig. 3, in order that the outer end of the lever 15 may stand directly opposite the outer end of the arm 10. The outer ends of the arm and the lever are directly opposite the outer face of the clutch drum 7. The remaining end of the clutch band 14 has riveted thereon the lug 18 having a hole to receive loosely the screw 19 which has its outer end connected to the outer end of the clutch lever 15 by the pivot pin 20. The screw 19 is held securely in any selected adjustment by the nuts 21 threaded thereon and bearing against the ends of the lug 18.

The lever 15 is shaped to have the end not attached to the clutch band extending angularly out over the shaft 1 opposite the inner face of the drum 7. This end of the lever has a hollow lug or housing 22 standing at substantially a right angle to the axial center of the shaft 1. 23 is a sliding block or post working in the hollow in the housing 22. It carries at its inner end the wheel or roller 24 held with its axis at right angles to the axis of the shaft 1, by the cross-pin 25 slidable along the walls 26 left by cutting out a portion of the side of the housing 22. The pin 25 also limits the movement of the post toward the shaft 1. Within the housing 22, the post 23 is reduced from the shoulder 27 to its outer end which extends out beyond the housing. A coiled spring 28 surrounds the reduced part of the post 23 and rests on the said shoulder. The outer end of the spring is confined by the annular screw-plug 29 which surrounds the outer end of the post and screws into the outer end of the housing 22. 30 is a spring attached to the outer end of the casing 22 and to the lug 31 on the hub of the arm 10 to yieldingly press the inner end of the lever 15 toward the shaft 1.

32 is a cam block splined on the shaft 1 and slid along the shaft 1 by any suitable device in the annular groove 33 in the outer portion of the block. The block is located on that side of the wheel 24 which is toward the crank 2 and has its inner end or the end nearest the said wheel tapered so as to gradually lift the inner end of the lever 15 when the block is moved toward the clutch drum 7.

The clutch-band 14 is adjusted by the nuts 21 so that it is just free from dragging on the drum 7. When the cam block 32 is as shown in Fig. 1, where the lever 15 is unaffected by the cam block and the spring 30 is pulling the inner end of the lever to its innermost position, power applied to rotate the shaft 1 will not rotate the clutch drum 7 until the cam block 32 is moved beneath the wheel 24 so as to lift the inner end of the lever 15. The spring 28 is sufficiently stiff to resist compression while the lever is being rocked by the cam block to cause the clutch band 14 to grip the clutch drum 7 with enough force to rotate the latter and the bull-wheel 3. The direction of rotation of the shaft 1 and the driving arm 10 must be that indicated by the arrow 34. The load carried by the pin 13 is much greater than the load carried by the pin 20 due to the snubbing effect of the clutch band 14 as it is pulled around the rim of the clutch drum 7. As the pin 13 is directly connected to the rigid driving arm 10 it is better able to carry the load than the pin 20 which is carried by the smaller lever 15. Should the direction of rotation of the shaft 1 be reversed without first releasing the clutch band 14 by moving the cam block from beneath the wheel 24, the heavy load will be transmitted to the pin 20, which cannot well be designed to carry as great a load as the pin 13. In order to automatically release a part of this load from the pin 20, I have employed the spring 28 arranged as described. It is apparent that the clutch lever 15 will have its outer end automatically moved slightly away from the arm 10, if the direction of rotation as indicated by the arrow 34 is reversed, this movement of the lever being permitted by the spring 28 which is compressed slightly. This movement of the lever 15 releases the clutch band to slide around the clutch drum and relieve the parts from the enormous strains due to the sudden stopping and reversal of the shaft 1.

I claim—

1. A shaft, two clutch elements concentric therewith and one driven thereby, one element being a clutch-drum and the other a clutch-band arranged to frictionally engage the periphery of the clutch-drum, means causing a driving connection to be established between the clutch-drum and the clutch-band when the shaft turns in one direction, and means embodied in the first means automatically relieving the driving connection when the direction of rotation of the shaft is reversed without operating the said causing means.

2. In well-drilling machinery, a power shaft, a clutch-drum loose thereon, a clutch-arm rigidly connected to the shaft, a clutch-lever pivotally connected to the clutch-arm, a clutch-band adapted to the periphery of the clutch-drum and having its ends connected respectively to the clutch-arm and the clutch-lever, means causing the clutch-lever to contract the clutch-band tightly upon the clutch-drum when the shaft is turned in one direction, and means automatically relieving the driving connection when the direction of rotation of the shaft is reversed without operating the said causing means.

3. In well-drilling machinery, a power shaft, a clutch-drum loose thereon, a clutch-arm rigidly connected to the shaft, a clutch-lever pivotally connected to the clutch-arm, a clutch-band adapted to the periphery of the clutch-drum and having its ends connected respectively to the clutch-arm and the clutch-lever, means operating the clutch-lever to contract the clutch-band tightly upon the clutch-drum, and means independent of the said operating means for relieving the friction between the clutch-drum and clutch-band when the direction of rotation of the shaft is reversed.

4. In well-drilling machinery, a power shaft, a clutch-drum loose thereon, a clutch-arm rigidly connected to the shaft, a clutch-lever pivotally connected to the clutch-arm, a clutch-band adapted to the periphery of the clutch-drum and having its ends connected respectively to the clutch-arm and the clutch-lever, means operating the clutch-lever to contract the clutch-band tightly upon the clutch-drum, and a spring allowing said clutch-arm to move independently of said operating means for relieving the friction between the clutch-drum and clutch-band when the direction of rotation of the shaft is reversed.

5. The combination of a power shaft, a clutch-drum loose thereon, a clutch-arm rigidly connected to said shaft, a clutch lever pivoted between its ends to the clutch-arm, a clutch-band connected to the outer end of the clutch-arm and the clutch-lever, a cam on the shaft operable to tighten the clutch band upon the clutch-drum, a spring connection for the lever whereby the clutch-band may automatically be relieved of a part of its friction on the clutch-drum without operating the cam, when the direction of rotation of the shaft is reversed.

In testimony whereof I hereunto affix my signature this 21st day of Sept., 1923.

CLYDE S. WRIGHT.